United States Patent
Zhang et al.

(10) Patent No.: US 7,246,115 B2
(45) Date of Patent: Jul. 17, 2007

(54) MATERIALIZED VIEW SIGNATURE AND EFFICIENT IDENTIFICATION OF MATERIALIZED VIEW CANDIDATES FOR QUERIES

(75) Inventors: Guogen Zhang, San Jose, CA (US); Irene Ching-Hua Liu, San Jose, CA (US); Ding-Wei Chieh, Cupertino, CA (US); Lee-Chin Hsu Liu, San Jose, CA (US); Yao-Ching Stephen Chen, Saratoga, CA (US); Hsuiying Yen Cheng, Fremont, CA (US); Brian Thinh-Vinh Tran, San Jose, CA (US); Yun Wang, Saratoga, CA (US); Ruiping Li, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 140 days.

(21) Appl. No.: 10/324,800

(22) Filed: Dec. 19, 2002

(65) Prior Publication Data
US 2004/0122804 A1    Jun. 24, 2004

(51) Int. Cl.
*G06F 17/30* (2006.01)
(52) U.S. Cl. .............................. 707/3; 707/4; 707/101; 707/102
(58) Field of Classification Search .................... 707/1, 707/2, 3, 4, 5, 6, 7, 8, 9, 10, 100; 717/140
See application file for complete search history.

(56) References Cited

U.S. PATENT DOCUMENTS

| | | | |
|---|---|---|---|
| 5,991,754 A | 11/1999 | Raitto et al. | 707/2 |
| 6,334,128 B1 | 12/2001 | Norcott et al. | 707/5 |
| 6,339,769 B1 | 1/2002 | Cochrane et al. | 707/2 |
| 6,345,272 B1* | 2/2002 | Witkowski et al. | 707/4 |
| 6,353,828 B1* | 3/2002 | Ganesh et al. | 707/8 |
| 6,356,890 B1 | 3/2002 | Agrawal et al. | 707/2 |
| 6,356,891 B1 | 3/2002 | Agrawal et al. | 707/2 |
| 6,366,903 B1 | 4/2002 | Agrawal et al. | 707/2 |
| 6,510,422 B1* | 1/2003 | Galindo-Legaria et al. | 707/2 |
| 6,513,029 B1* | 1/2003 | Agrawal et al. | 707/2 |
| 6,581,205 B1* | 6/2003 | Cochrane et al. | 717/140 |
| 6,735,587 B2 | 5/2004 | Colby et al. | 707/100 |

FOREIGN PATENT DOCUMENTS

WO    0210992    2/2002

OTHER PUBLICATIONS

Goldstein, Jonathan et al., "Optimizing Queries Using Materialized Views: A Practical, Scalable Solution," Microsoft Research, 12 pages, May 2001.

* cited by examiner

*Primary Examiner*—Yicun Wu
(74) *Attorney, Agent, or Firm*—Sawyer Law Group LLP

(57) ABSTRACT

A method and system for efficiently identifying materialized view candidates for queries filters materialized views using certain criteria, using the materialized view signatures. This filtering rejects some of the unqualified materialized views prior to the performance of the query rewrite matching algorithm, resulting in a group of materialized view candidates. The query rewrite matching algorithm is then performed on the materialized view candidates. By first filtering the materialized views based on their signatures, the number of materialized views on which the query rewrite matching algorithm is performed is significantly reduced, improving performance.

23 Claims, 3 Drawing Sheets

US 7,246,115 B2

MATERIALIZED VIEW SIGNATURE AND EFFICIENT IDENTIFICATION OF MATERIALIZED VIEW CANDIDATES FOR QUERIES

FIELD OF THE INVENTION

The present invention relates to databases, and more particularly to the analysis of information in the databases.

BACKGROUND OF THE INVENTION

Data warehouse application environments are well known in the art. The environment typically comprises a database, which stores base tables and a catalog, and a database management system with a processor, which processes queries on the base tables. The catalog contains information about the set of tables and views maintained by the database manager. Views are logical tables that contain data that is generated by a query. In such an environment, operational business data stored in base tables are usually huge in volume. To improve performance in decision support or on-line analytic processing (OLAP) queries, the data are frequently summarized and stored in pre-computed "materialized" views. Materialized views are also known as summary tables, materialized query tables, and indexed views. A materialized view contains two parts: a materialized view definition and a stored result of the view. For a given query on base tables, a database engine searches for materialized views that may provide a result for the query. For a given query, a query rewrite matching algorithm is performed on the materialized views to determine which would satisfy the query. In this manner, a search of the base tables themselves is avoided, achieving performance gain.

However, to satisfy diverse query requirements, many materialized views are required. Thus, the number of materialized view candidates can still be large. The performance of the query rewrite matching algorithm on the materialized views can be time consuming and expensive.

Accordingly, there exists a need for a method and system for efficiently identifying materialized view candidates for queries. The method and system should provide early rejection of unqualified materialized view prior to the performance of the query rewrite matching algorithm. The present invention addresses such a need.

SUMMARY OF THE INVENTION

A method and system for efficiently identifying materialized view candidates for queries filters materialized views using certain criteria, using the materialized view signatures. This filtering rejects some of the unqualified materialized views prior to the performance of the query rewrite matching algorithm, resulting in a group of materialized view candidates. The query rewrite matching algorithm is then performed on the materialized view candidates. By first filtering the materialized views based on their signatures, the number of materialized views on which the query rewrite matching algorithm is performed is significantly reduced, improving performance.

DETAILED DESCRIPTION

The present invention provides a method and system for efficiently identifying materialized view candidates for queries. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention filters materialized views using certain criteria, using the materialized view signatures. This filtering rejects some of the unqualified materialized views prior to the performance of the query rewrite matching algorithm, resulting in a group of materialized view candidates. The query rewrite matching algorithm is then performed on the materialized view candidates. By first filtering the materialized views based on their signatures, the number of materialized views on which the query rewrite matching algorithm is performed is significantly reduced, improving performance.

To more particularly describe the features of the present invention, please refer to FIGS. 1 through 3 in conjunction with the discussion below.

Figure 1:
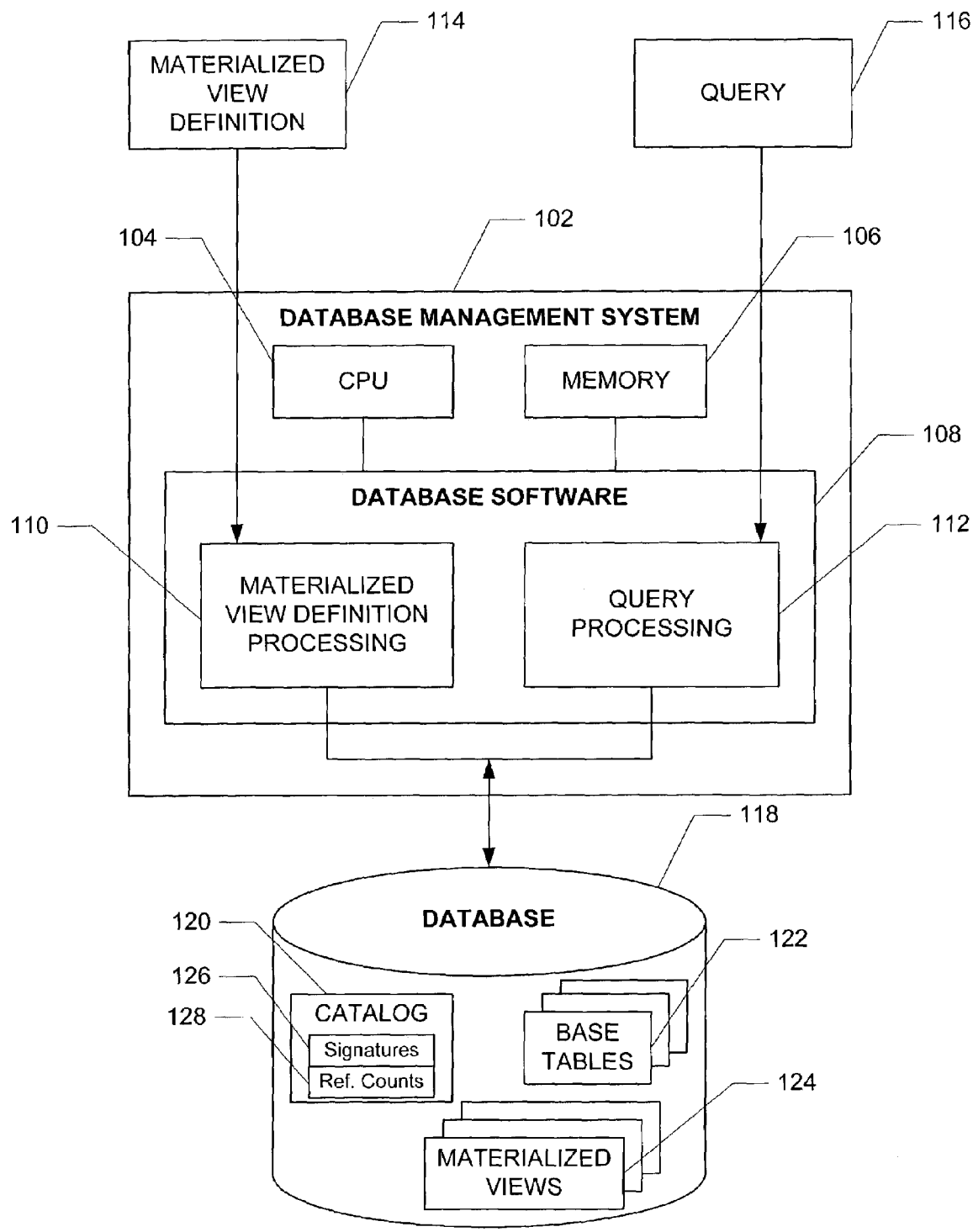
FIG. 1 illustrates a preferred embodiment of a system for efficiently identifying materialized view candidates for queries in accordance with the present invention.

FIG. 1 illustrates a preferred embodiment of a system for efficiently identifying materialized view candidates for queries in accordance with the present invention. The system comprises a database management system 102 and a database 118. The database management system 102 comprises a central processing unit (CPU) 104, memory 106, and database software 108. The database software 108 comprises software for materialized view definition processing 110 and query processing 112, among others. The database 118 comprises a catalog 120, base tables 122, materialized views 124, and a log (not shown). The system 102 is illustrated with elements relevant to the present invention but may also comprise other elements.

To create materialized views 124, a materialized view definition 114 is input into the materialized view definition processing software 110. The materialized view definition processing software 110 creates the materialized view and its signature based on the input materialized view definition 114. The software 110 then stores the materialized view and its signature in the database 118. In the preferred embodiment, the materialized view signatures 126 are stored in the catalog 120, however, they can be stored elsewhere without departing from the spirit and scope of the present invention.

In the preferred embodiment, the catalog 120 also contains a reference count 128 for each base table 122. The reference counts 128 are the number of materialized views that reference each base table 122. The reference counts 128 for the appropriate base tables 122 are incremented at the time the materialized views are created. A list of materialized views 124 defined on each base table is also kept in the catalog 120.

Below is an example of a materialized view definition 114:

```
SELECT T1.C1, T2.C2, SUM(T2.C3), COUNT (T2.C3), ...
FROM T1, T2, ..., Tn
WHERE   T1.C1 = T2.C1 and
        T2.C2 = T3.C2 ... and
        T1.D > 5 and
        (T2.E > 'A' or T3.F < 20) ...
GROUP BY T1.C1, T2.C2;
```

The SELECT clause specifies the columns of the final result table or materialized view. Thus, for the materialized view definition 114, the resulting materialized view has a first column named "T1.C1", a second column named "T2.C2", a third column named "SUM(T2.C3)", and a fourth column named "COUNT (T2.C3)", etc. SUM is a function that returns a set of numbers. COUNT is a function that returns the number of rows or values in a set of rows or values.

The FROM clause specifies the base tables or views from which the materialized view is derived. The WHERE clause specifies the predicates for the materialized view. Predicates are conditions that are true, false, or unknown about a given row or group. The statements "T1.C1=T2.C1" and "T2.C2=T3.C2" are join predicates, i.e., conditions between two tables. The statements T1.D>5 and (T2.E>'A' or T3.F<20) are local predicates, i.e., conditions for a single table.

The GROUP BY clause lists the grouping of the rows of the materialized view. Each column name listed unambiguously identifies a column of the materialized view.

From this definition 114, a materialized view is created by the materialized view definition processing software 110 and stored in the database 118 with the other materialized views 124. The software 110 also creates a signature for the materialized view and stores it in the catalog 120.

In the preferred embodiment, the signature for the materialized view comprises a list of base tables and the predicate patterns. Other information can also be in the signature, including: column equivalence; grouping information; select list columns; set function information; and critical tables. Critical tables are base tables that must be included in a query for the materialized view to qualify as a materialized view candidate. A base table is critical if its removal from the materialized view definition leads to a different result.

Thus, for the example materialized view definition above, the signature comprises the following:

(1) Source tables: T1, T2, . . . , Tn.
(2) Critical tables: T1, T2, T3.
(3) Predicate patterns: local predicate: (1) T1.D and (2) T2.E or T3.F.
(4) Column equivalence: T1.C1=T2.C1, T2.C2=T3.C2.
(5) Grouping information: T1.C1, T2.C2.
(6) Select list columns: T1.C1, T2.C2, both are primary keys.
(7) Set function information: SUM(T2.C3), COUNT (T2.C3).

Figure 2:
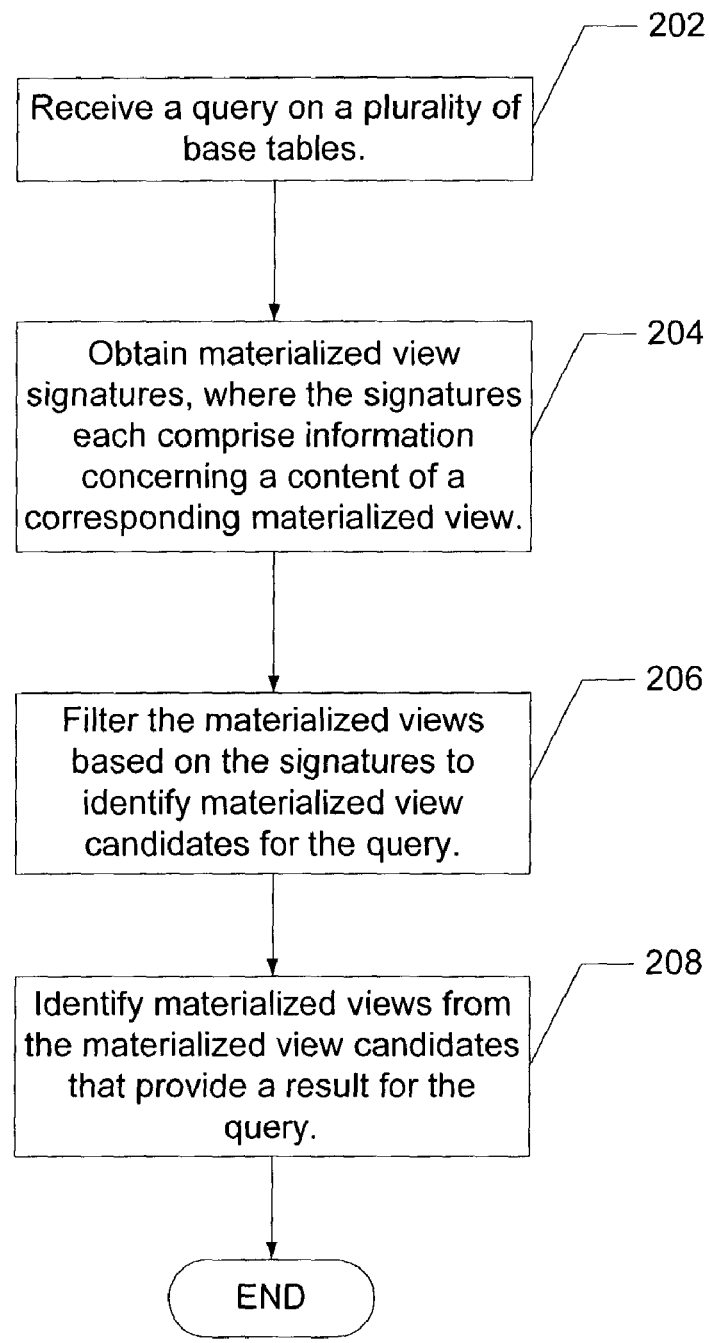
FIG. 2 is a flowchart illustrating a preferred embodiment of a method for efficiently identifying materialized view candidates for queries in accordance with the present invention.

FIG. 2 is a flowchart illustrating a preferred embodiment of a method for efficiently identifying materialized view candidates for queries in accordance with the present invention. Once the materialized views 124 are created, a query 116 on the plurality of base tables 122 is received by the query processing software 112, via step 202. The query processing software 112 next obtains the materialized view signatures 126, via step 204. Each signature comprises information concerning a content of a corresponding materialized view. Then, the query processing software 112 filters the materialized views 124 based on their signatures 126 to identify materialized view candidates for the query 116, via step 206. In the filtering step, materialized views that do not meet certain requirements, i.e., they cannot provide a result for the query 116, are rejected as candidates. The query processing software 112 next identifies the materialized views from the materialized view candidates that provide a result for the query 116, via step 208. In the preferred embodiment, this is done by performing the query rewrite matching algorithm on each materialized view candidate. By first filtering the materialized views based on their signatures, the number of materialized views on which the query rewrite matching algorithm is performed is significantly reduced, improving performance.

In the preferred embodiment, several possible criteria are used in the filtering step. As will be understood by one of ordinary skill in the art, one or more of these criteria, as well as other criteria, may be used without departing from the spirit and scope of the present invention:

Common Table Criterion: The materialized view definition and the query should have common base tables.

Lossless Join Criterion: If the materialized view definition contains more base tables than the query, then the extra base tables should be losslessly joined to the common tables. There should be a join between a common table and an extra table whose join columns have the foreign key and primary key relationship, and the foreign key cannot be null. In addition, the extra tables cannot have any local predicates.

Predicate Subsumption Criterion: For a materialized view to provide sufficient data for the query, the local predicate in the query must subsume those in the material view definition. The predicates in the materialized view definition should not filter out any data that the query requires.

Scalar Expression Derivability Criterion: A scalar expression of the query must be able to derive from those in the materialized view, or the columns can be derived from a join back of a base table through its primary key, which is included in the materialized view.

Aggregate Derivability Criterion: The aggregate functions of the query can be derived from the materialized view.

Figure 3:
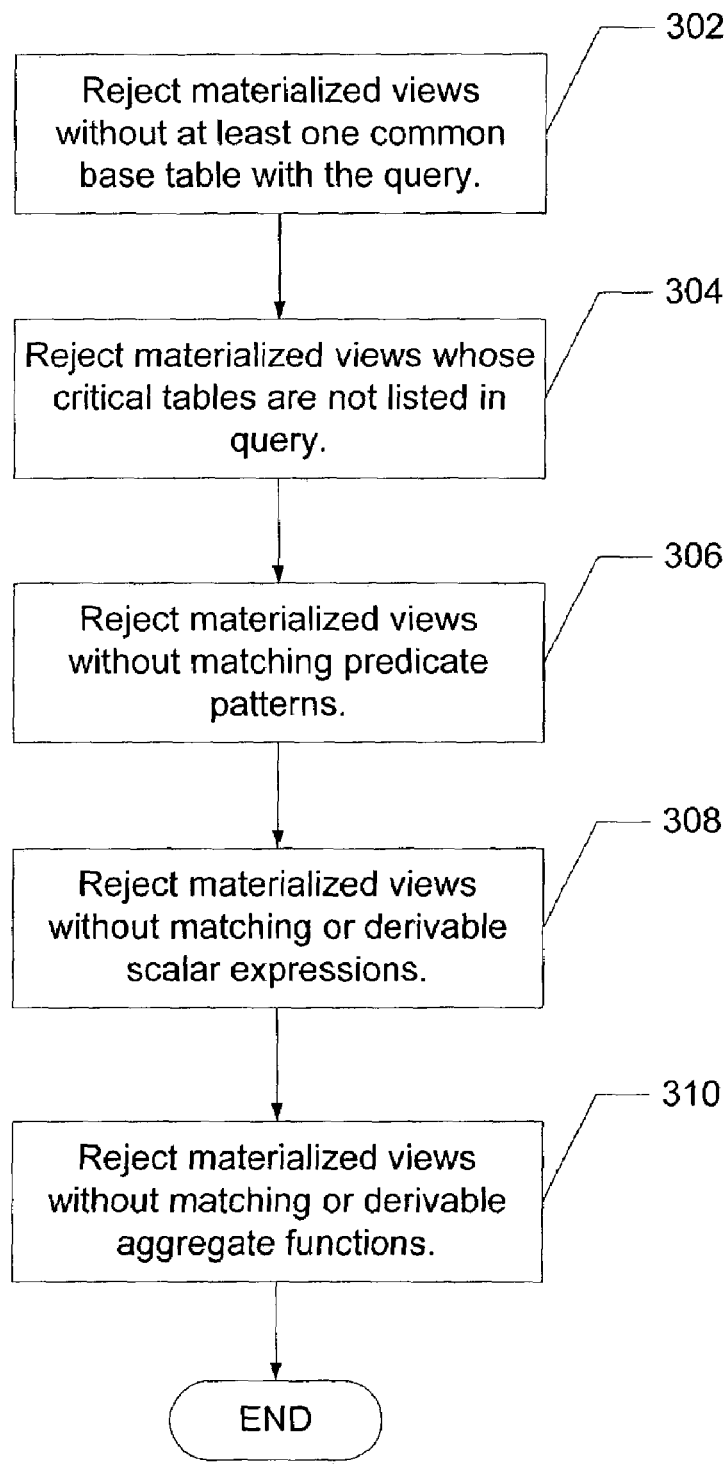
FIG. 3 is a flowchart illustrating a preferred embodiment of the filtering step of the method for efficiently identifying materialized view candidates for queries in accordance with the present invention.

FIG. 3 is a flowchart illustrating a preferred embodiment of the filtering step of the method for efficiently identifying materialized view candidates for queries in accordance with the present invention. In the preferred embodiment, the criteria described above are applied. First, materialized views without at least one common base table with the query 116 are rejected as candidates, via step 302. At least one of the base tables listed in the FROM clause of the query 116 must also be listed as a base table in a materialized view signature for the materialized view to be a candidate. If this is not the case, then the materialized view is rejected.

Alternatively, the reference counts 128 stored in the catalog 120 can be checked prior to obtaining the materialized view signatures. The reference count of each base table listed in the query 116 is examined. If the reference count for a base table is zero, then there are no materialized views for this base table. If the reference count for a base table is non-zero, then the materialized views defined on this base table are found. This is repeated for each base table. Duplicate listings of the materialized views are then removed, resulting in a unique list of materialized views that have at least one common base table with the query 116. The rejecting step 302 can thus be skipped.

Next in the filtering step, the materialized views whose critical tables are not listed in the query 116 are rejected, via step 304. The critical tables for a materialized view are listed in the materialized view signature. All of the critical tables listed in the materialized view signature must also be listed in the query 116 for the materialized view to be a candidate. If not, then the materialized view is rejected. In the preferred embodiment, to increase efficiency, only the columns with predicates are checked, rather than the subsumption details. Alternatively, only the tables with predicates can be checked.

Next, materialized views that do not have matching predicates patterns are rejected, via step 306. The predicates of the query 116 must either match or subsume the predicates in the materialized view signature. For example, assume that C1>0 is a predicate in the query 116 while C1>5 is a predicate in the materialized view signature. Since C1>0 cannot be subsumed in C1>5, the materialized view is rejected as a candidate.

Next, materialized views without matching or derivable scalar expressions are rejected, via step 308. In the preferred embodiment, the special case of column derivability is checked. In column derivability checking, for a column in the SELECT list of the query 116, one of the following conditions must hold for the materialized view to be a candidate: (1) the same column is in the select list columns of the materialized view signature; (2) an equivalent column, according to the column equivalence list, is in the select list columns of the materialized view signature; (3) the column's primary key is in the select list columns of the materialized view signature; or (4) an equivalent column, according to the column equivalence list, of the primary key is in the select list columns of the materialized view signature. If none of these conditions hold, the materialized view is rejected.

Next, the materialized views without matching or derivable aggregate functions are rejected, via step 310. In the preferred embodiment, certain aggregate functions are checked:

COUNT: The COUNT function returns the number of rows or values in a set of rows or values. Either COUNT is in the materialized view signature or the argument can be derived from it.

SUM: The SUM function returns the sum of a set of numbers. Either SUM is in the materialized view signature or its argument can be derived from it. MAX: The MAX function returns the maximum value in a set of values. Either MAX is in the materialized view signature or its argument can be derived from it.

MIN: The MIN function returns the minimum value in a set of values. Either MIN is in the materialized view signature or its argument can be derived from it.

AVG: The AVG function returns the average of a set of numbers. Either AVG, or both SUM and COUNT with the same argument are in the materialized view signature, or its argument can be derived from them.

VAR (VAR.SAMP): The VAR (VAR.SAMP) function returns the (sample) variance of a set of numbers. Either VAR (VAR.SAMP), or all of SUM, COUNT, and SUM of its argument squared are in the materialized view signature, or its argument can be derived from them.

STDDEV (STDDEV.SAMP): The STDDEV (STDDEV.SAMP) function returns the (sample) standard deviation of a set of numbers. Either VAR (VAR.SAMP), STDDEV (STDDEV.SAMP), or all of SUM, COUNT, and SUM of its argument squared are in the materialized view signature, or its argument can be derived from them.

If any of the above checking fails, the materialized view is rejected.

To promote efficiency, in the preferred embodiment, the check of arguments is done only when the argument is a simple column. Expressions other than simple columns are ignored during the filtering step.

For example, assume that the query is the following:

```
SELECT T2.C1, T2.C2, AVG(T2.C3)
FROM T1, T2, ..., Tn-1
WHERE    T1.C1 = T2.C1 and
         T2.C2 = T3.C2 ... and
         T1.D > 10 and
         T2.E > 'B'
GROUP BY T2.C1, T2.C2;
```

The example materialized view signature given above is a candidate for this query, since it is not rejected during the filter step. In particular, note that T1.C1=T2.C1. A local predicate exists on T1 and T2 for the query. The materialized view thus has the same or equivalent local predicates as the query on T1, and either T2 or T3, as T2.C2 and T3.C2 are equivalents. Note also that the local predicates in the query (T1.D>10 and T2.E>'B') subsumes the local predicates in the signature (T1.D>5 and (T2.E>'A' or T3.F<20)). This materialized view thus satisfies the requirement that predicate patterns of the materialized view match that of the query, via step 306. Note also that AVG (T2.C3) in the query can be derived from SUM(T2.C3) and COUNT(T2.C3) in the signature, satisfying the requirement that the aggregate functions and grouping criteria of the materialized view match or are derivable, via step 308.

For another example, assume that the query is the following:

```
SELECT T1.C1, SUM(T2.C3), COUNT(T2.C3), ...
FROM T1, T2, ..., Tn
WHERE    T1.C1 = T2.C1 and
         T2.C2 = T3.C2 ... and
         T1.D > 5
GROUP BY T1.C1;
```

The example materialized view signature given above is not a candidate for this query because the predicate patterns for the materialized view signature does not match that of the query. This materialized view is thus rejected at step 306.

Once the filtering step is concluded, the remaining non-rejected materialized views are candidates for the query. The query rewrite matching algorithm can then be performed on these candidates.

A method and system for efficiently identifying materialized view candidates for queries has been disclosed. The method and system filters materialized views using certain criteria, using the materialized view signatures. This filtering rejects some of the unqualified materialized views prior to the performance of the query rewrite matching algorithm, resulting in a group of materialized view candidates. The query rewrite matching algorithm is then performed on the materialized view candidates. By first filtering the materialized views based on their signatures, the number of materialized views on which the query rewrite matching algorithm is performed is significantly reduced, improving performance.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for efficiently identifying materialized view candidates for queries in a database system, the database system including a plurality of base tables, a plurality of materialized views, and a plurality of materialized view signatures corresponding to the materialized views, comprising the steps of:
    (a) receiving a query on the base tables;
    (b) obtaining the materialized view signatures, wherein each materialized view signature comprises information concerning a content of the corresponding materialized view and wherein each of the plurality of signatures comprises:
        a list of base tables for the corresponding materialized view, and
        predicate patterns for the corresponding materialized view;
    (c) filtering the materialized views based on the materialized view signatures to identify materialized view candidates for the query, wherein the filtering step (c) comprises:
        (c1) rejecting a materialized view as a candidate if the materialized view does not have at least one common base table with the query; and
    (d) performing a query rewrite matching algorithm on each materialized view candidate to identify materialized views from the materialized view candidates that provide a result for the query.

2. The method of claim 1, wherein before the obtaining step (b) comprises:
    (b1) determining non-zero references counts for the base tables listed in the query;
    (b2) identifying the materialized views created on the base tables with non-zero reference counts; and
    (b3) removing duplicate materialized views, resulting in a group of materialized views with at least one common base table with the query.

3. The method of claim 1, wherein the rejecting step (c1) comprises:
    (c1i) rejecting the materialized view as a candidate if the materialized view signature does not list at least one common base table with the query.

4. The method of claim 1, wherein the filtering step (c) further comprises:
    (c2) rejecting the materialized view as a candidate if any critical table listed in the materialized view signature is not listed in the query.

5. The method of claim 4, wherein the filtering step (c) further comprises:
    (c3) rejecting the materialized view as a candidate if predicates of the query does not match or subsume predicates in the materialized view signature.

6. The method of claim 5, wherein the filtering step (c) further comprises:
    (c4) rejecting the materialized view as a candidate if the materialized view signature does not have scalar expressions that either match scalar expressions of the query or are derivable to match the scalar expressions of the query.

7. A method for efficiently identifying materialized view candidates for queries in a database system, the database system including a plurality of base tables, a plurality of materialized views, and a plurality of materialized view signatures corresponding to the materialized views, comprising:
    (a) receiving a query on the base tables;
    (b) obtaining the materialized view signatures, wherein each materialized view signature comprises information concerning a content of the corresponding materialized view; and
    (c) filtering the materialized views based on the materialized view signatures to identify materialized view candidates for the query, comprising:
        (c1) rejecting a materialized view as a candidate if the materialized view does not have at least one common base table with the query;
        (c2) rejecting the materialized view as a candidate if any critical table listed in the materialized view signature is not listed in the query;
        (c3) rejecting the materialized view as a candidate if predicates of the query does not match or subsume predicates in the materialized view signature; and
        (c4) rejecting the materialized view as a candidate if the materialized view signature does not have scalar expressions that either match scalar expressions of the query or are derivable to match the scalar expressions of the query, comprising:
            (c4i) rejecting the materialized view as a candidate if none of the following conditions hold true:
                (A) a column in the query is also listed in the materialized view signature;
                (B) an equivalent of the column in the query is also listed in the materialized view signature;
                (C) a primary key of the column in the query is also listed in the materialized view signature; or
                (D) a primary key of the equivalent of the column in the query is also listed in the materialized view signature.

8. A method for efficiently identifying materialized view candidates for queries in a database system, the database system including a plurality of base tables, a plurality of materialized views, and a plurality of materialized view signatures corresponding to the materialized views, comprising:
    (a) receiving a query on the base tables;
    (b) obtaining the materialized view signatures, wherein each materialized view signature comprises information concerning a content of the corresponding materialized view; and
    (c) filtering the materialized views based on the materialized view signatures to identify materialized view candidates for the query, comprising:
        (c1) rejecting a materialized view as a candidate if the materialized view does not have at least one common base table with the query;
        (c2) rejecting the materialized view as a candidate if any critical table listed in the materialized view signature is not listed in the query;

(c3) rejecting the materialized view as a candidate if predicates of the query does not match or subsume predicates in the materialized view signature;

(c4) rejecting the materialized view as a candidate if the materialized view signature does not have scalar expressions that either match scalar expressions of the query or are derivable to match the scalar expressions of the query; and (c5) rejecting the materialized view if the materialized view signature does not have aggregate functions that either match aggregate functions of the query or are derivable to match the aggregate functions of the query.

9. The method of claim 8, wherein the aggregate functions comprises one or more of the group consisting of:

a COUNT function;

a SUM function;

a MAX function;

a MIN function;

an AVG function;

a VAR function;

a STDDEV function;

a VAR.SAMP function; and a STDDEV.SAMP function.

10. The method of claim 8, wherein arguments for the aggregate functions consists of a simple column.

11. A computer readable storage medium encoded with a computer program for efficiently identifying view candidates for queries in a database system, the database system including a plurality of base tables, a plurality of materialized views, and a plurality of materialized view signatures corresponding to the materialized views, the computer program comprising instructions for:

(a) receiving a query on the base tables;

(b) obtaining the materialized view signatures, wherein each materialized view signature comprises information concerning a content of the corresponding materialized view and wherein each of the plurality of signatures comprises:

a list of base tables for the corresponding materialized view, and predicate patterns for the corresponding materialized view;

(c) filtering the materialized views based on the materialized view signatures to identify materialized view candidates for the query, wherein the filtering instruction (c) comprises:

(c1) rejecting a materialized view as a candidate if the materialized view does not have at least one common base table with the query; and (d) performing a query rewrite matching algorithm on each materialized view candidate to identify materialized views from the materialized view candidates that provide a result for the query.

12. The medium of claim 11, wherein before the obtaining instruction (b) comprises:

(b1) determining non-zero references counts for the base tables listed in the query;

(b2) identifying the materialized view created on the base tables with non-zero reference counts; and (b3) removing duplicate materialized views, resulting in a group of materialized views with at least one common base table with the query.

13. The medium of claim 11, wherein the rejecting instruction (c1) comprises:

(c1i) rejecting the materialized view as a candidate if the materialized view signature does not list at least one common base table with the query.

14. The medium of claim 11, wherein the filtering instruction (c) further comprises:

(c2) rejecting the materialized view as a candidate if any critical table listed in the materialized view signature is not listed in the query.

15. The medium of claim 14, wherein the filtering instruction (c) further comprises:

(c3) rejecting the materialized view as a candidate if predicates of the query does not match or subsume predicates in the materialized view signature.

16. The medium of claim 15, wherein the filtering instruction (c) further comprises:

(c4) rejecting the materialized view as a candidate if the materialized view signature does not have scalar expressions that either match scalar expressions of the query or are derivable to match the scalar expressions of the query.

17. A computer readable storage medium with program instructions for efficiently identifying materialized view candidates for queries in a database system, the database system including a plurality of base tables, a plurality of materialized views, and a plurality of materialized view signatures corresponding to the materialized views, comprising instructions for:

(a) receiving a query on the base tables;

(b) obtaining the materialized view signatures, wherein each materialized view signature comprises information concerning a content of the corresponding materialized view; and (c) filtering the materialized views based on the materialized view signatures to identify materialized view candidates for the query, comprising:

(c1) rejecting a materialized view as a candidate if the materialized view does not have at least one common base table with the query;

(c2) rejecting the materialized view as a candidate if any critical table listed in the materialized view signature is not listed in the query;

(c3) rejecting the materialized view as a candidate if predicates of the query does not match or subsume predicates in the materialized view signature; and (c4) rejecting the materialized view as a candidate if the materialized view signature does not have scalar expressions that either match scalar expressions of the query or are derivable to match the scalar expressions of the query, comprising:

(c4i) rejecting the materialized view as a candidate if none of the following conditions hold true:

(A) a column in the query is also listed in the materialized view signature;

(B) an equivalent of the column in the query is also listed in the materialized view signature;

(C) a primary key of the column in the query is also listed in the materialized view signature; or (D) a primary key of the equivalent of the column in the query is also listed in the materialized view signature.

18. A computer readable storage medium with program instructions for efficiently identifying materialized view candidates for queries in a database system, the database system including a plurality of base tables, a plurality of materialized views, and a plurality of materialized view signatures corresponding to the materialized views, comprising instructions for:

(a) receiving a query on the base tables;

(b) obtaining the materialized view signatures, wherein each materialized view signature comprises information concerning a content of the corresponding materialized view; and (c) filtering the materialized views based on the materialized view signatures to identify materialized view candidates for the query, comprising:

(c1) rejecting a materialized view as a candidate if the materialized view does not have at least one common base table with the query;

(c2) rejecting the materialized view as a candidate if any critical table listed in the materialized view signature is not listed in the query;

(c3) rejecting the materialized view as a candidate if predicates of the query does not match or subsume predicates in the materialized view signature;

(c4) rejecting the materialized view as a candidate if the materialized view signature does not have scalar expressions that either match scalar expressions of the query or are derivable to match the scalar expressions of the query; and (c5) rejecting the materialized view if the materialized view signature does not have aggregate functions that either match aggregate functions of the query or are derivable to match the aggregate functions of the query.

19. The medium of claim 18, wherein the aggregate functions comprises one or more of the group consisting of:
a COUNT function;
a SUM function;
a MAX function;
a MIN function;
an AVG function;
a VAR function;
a STDDEV function;
a VAR.SAMP function; and
a STDDEV.SAMP function.

20. The medium of claim 18, wherein arguments for the aggregate functions consists of a simple column.

21. A database system, comprising:
a plurality of base tables;
a plurality of materialized views;
a plurality of materialized view signatures corresponding to the plurality of materialized views, wherein each of the materialized view signatures comprises information concerning a content of the corresponding materialized view, and wherein each of the plurality of materialized view signatures comprises:
a list of base tables for thecorresponding materialized view, and
predicate patterns for the corresponding materialized view; and
a database management system, wherein the database management system
receives a query on the base tables,
obtains the materialized view signatures,
filters the materialized views based on the materialized view signatures to identify materialized view candidates for the query, wherein the database management system filters the materialized views by rejecting a materialized view as a candidate if the materialized view does not have at least one common base table with the query, and
performs a query rewrite matching algorithm on each materialized view candidate to identify materialized views from the materialized view candidates that provide a result for the query.

22. The database system of claim 21, wherein the database management system filters the materialized views by rejecting a materialized view as a candidate if the materialized view signature corresponding to the materialized view does not have scalar expressions that either match scalar expressions of the query or are derivable to match the scalar expressions of the query.

23. The database system of claim 21, wherein the database management system filters the materialized views by rejecting a materialized view as a candidate if the materialized view signature corresponding to the materialized view does not have aggregate functions that either match aggregate functions of the query or are derivable to match the aggregate functions of the query.

* * * * *